United States Patent
Yamaki et al.

(10) Patent No.: US 8,041,220 B2
(45) Date of Patent: Oct. 18, 2011

(54) REMOTE CONTROL DEVICE AND REMOTE CONTROL SYSTEM

(75) Inventors: Masahide Yamaki, Tokyo (JP); Shusuke Tsuchiya, Tokyo (JP); Kiyoshi Sekiguchi, Tokyo (JP)

(73) Assignee: Olympus Medical Systems Corp. (JP)

( * ) Notice: Subject to any disclaimer, the term of this patent is extended or adjusted under 35 U.S.C. 154(b) by 804 days.

(21) Appl. No.: 12/051,918

(22) Filed: Mar. 20, 2008

(65) Prior Publication Data
US 2009/0238572 A1  Sep. 24, 2009

(51) Int. Cl.
*H04B 10/00* (2006.01)
(52) U.S. Cl. ........................................ 398/107; 398/110
(58) Field of Classification Search .................. 398/206, 398/107, 108, 110, 135
See application file for complete search history.

(56) References Cited

U.S. PATENT DOCUMENTS

| | | | |
|---|---|---|---|
| 6,781,518 B1 | 8/2004 | Hayes et al. | |
| 2004/0030367 A1* | 2/2004 | Yamaki et al. | 607/60 |
| 2004/0204743 A1* | 10/2004 | McGrath et al. | 607/5 |
| 2009/0322582 A1* | 12/2009 | Baugh et al. | 341/176 |

FOREIGN PATENT DOCUMENTS

| | | |
|---|---|---|
| JP | A H09-247770 | 9/1997 |
| JP | A 2000-106057 | 4/2000 |
| JP | A 2006-305155 | 11/2006 |

* cited by examiner

*Primary Examiner* — Dalzid Singh
(74) *Attorney, Agent, or Firm* — Ostrolenk Faber LLP

(57) ABSTRACT

A remote control device controls a medical device or a medical control device for controlling the medical device by infrared light communication, and includes: an infrared light emission unit for emitting infrared light for performing infrared light communication; a control unit for allowing the infrared light emission unit to emit first infrared light for conveying control information for control of the medical device, and second infrared light conveying predetermined information and having a frequency different from that of the first infrared light; and an infrared light reception unit for receiving the infrared light emitted from the infrared light emission unit. The control unit determines whether or not the infrared light received by the infrared light reception unit is the second infrared light.

18 Claims, 15 Drawing Sheets

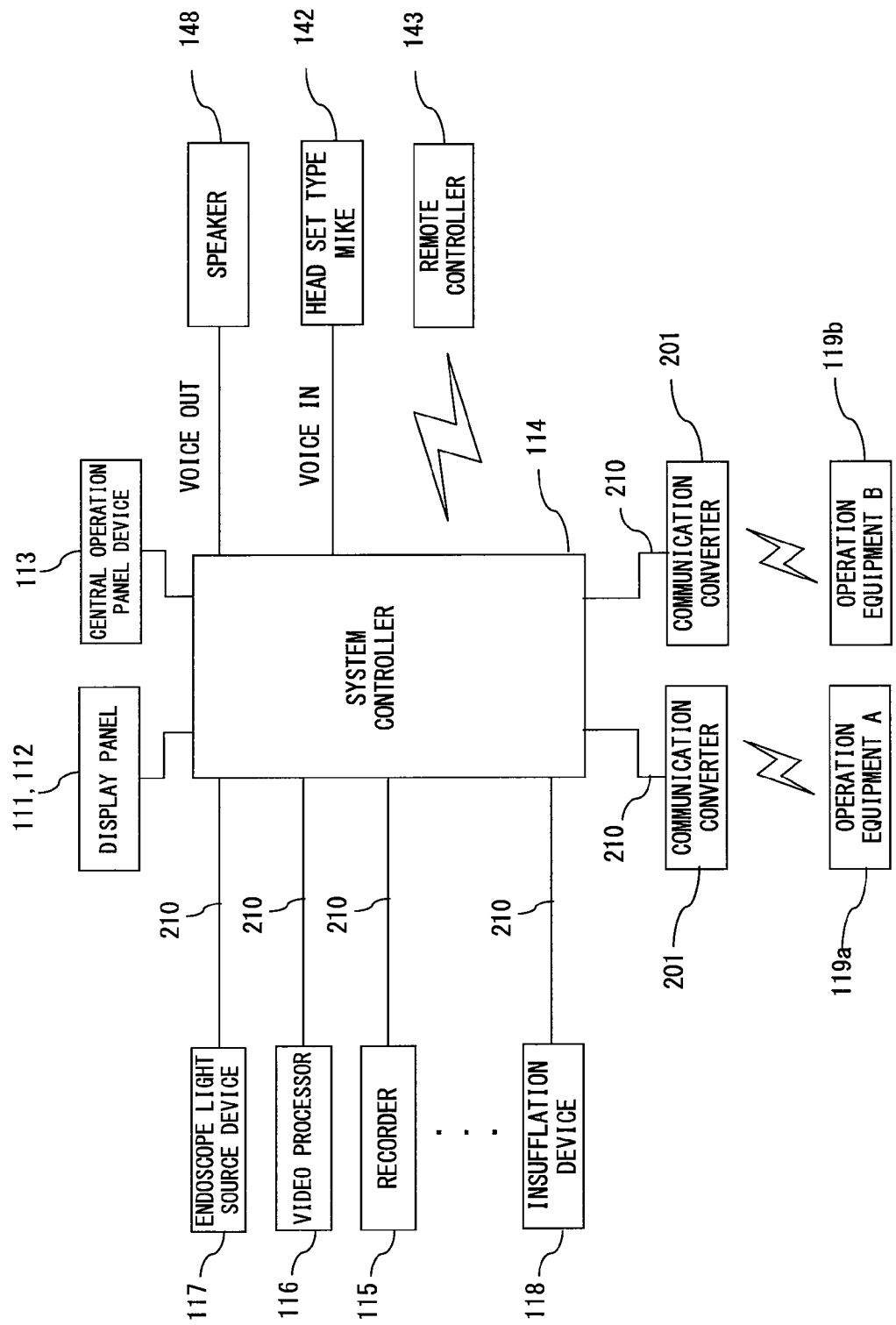
F I G. 2

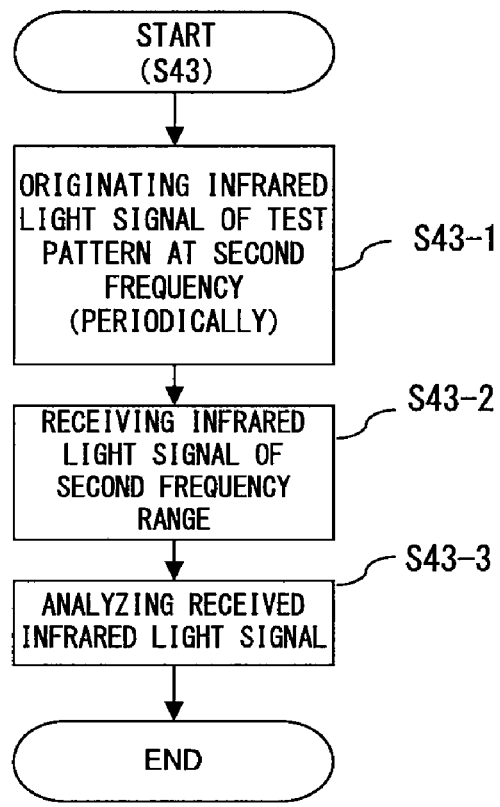
F I G. 1 5

REMOTE CONTROL DEVICE AND REMOTE CONTROL SYSTEM

FIELD OF THE INVENTION

The present invention relates to a remote control device for controlling a medical device or a medical control device for controlling the medical device by infrared light communications.

BACKGROUND OF THE INVENTION

Recently, surgery is performed using an endoscope operation system having a plurality of medical devices. In an endoscope operation system, when an organization of a living body is removed using an insufflation device for expanding a visceral cavity and a treating device etc. for treating an affected part, or hemostasis is performed using a high frequency cautery device, these treatments can be performed while watching images captured by an endoscope.

The endoscope operation system includes a plurality of medical devices for an endoscope operation, a system controller for controlling the medical devices, and a display operation device, etc. Thus, since the endoscope operation system is configured by a plurality of devices, it is necessary to use a common communication protocol to enable communications among the devices. However, manufacturers of medical devices adopt different communication methods and/or communication protocols for their own medical devices. Therefore, a communication converter is used to convert the communication methods and/or communication protocols to enable communications between them.

The communication system refers to a system of communications based on the physical or electrical configuration of communications such as infrared light communications, USB (Universal Serial Bus) communications, RS-232C communications, Controller Area Network (CAN), or Ethernet communications, etc. A difference in communication system refers to a difference in physical or electrical standards in various communications such as a difference between wireless communication and cable communication, a difference in shapes of a connectors, etc. (therefore, the difference disables a physical or electrical connection to be performed). A communication protocol refers to a normally adopted communication protocol, that is a logical connection as compared with the physical or electrical connection in the above-mentioned communication system.

SUMMARY OF THE INVENTION

The remote control device which controls a medical device or a medical control device for controlling the medical device by infrared light communication according to the present invention includes:

an infrared light emission unit for emitting infrared light for infrared light communication;

a control unit for allowing the infrared light emission unit to emit first infrared light for conveying control information for control of the medical device, and second infrared light conveying predetermined information, and having a frequency different from the first infrared light; and an infrared light reception unit for receiving the infrared light emitted from the infrared light emission unit; and the control unit determines whether or not the infrared light received by the infrared light reception unit is the second infrared light.

The remote control system according to the present invention has a medical device, a medical control device for controlling the medical device, and a remote control device for controlling the medical device or the medical control device by infrared light communications. With the configuration, the remote control device includes:

an infrared light emission unit for emitting infrared light for infrared communication;

a control unit for allowing the infrared light emission unit to emit first infrared light for conveying control information for control of the medical device, and second infrared light conveying predetermined information, and having a frequency different from the first infrared light; and an infrared light reception unit for receiving the infrared light emitted from the infrared light emission unit; and the control unit determines whether or not the infrared light received by the infrared light reception unit is the second infrared light.

BRIEF DESCRIPTION OF THE DRAWINGS

FIG. 2 is a system wiring diagram of a system controller 114 and medical devices configuring an endoscope operation system 1 according to the first through third embodiments of the present invention;

FIG. 15 is a detailed flow in S43 shown in FIG. 14.

DETAILED DESCRIPTION OF THE INVENTION

First Embodiment

Figure 1:
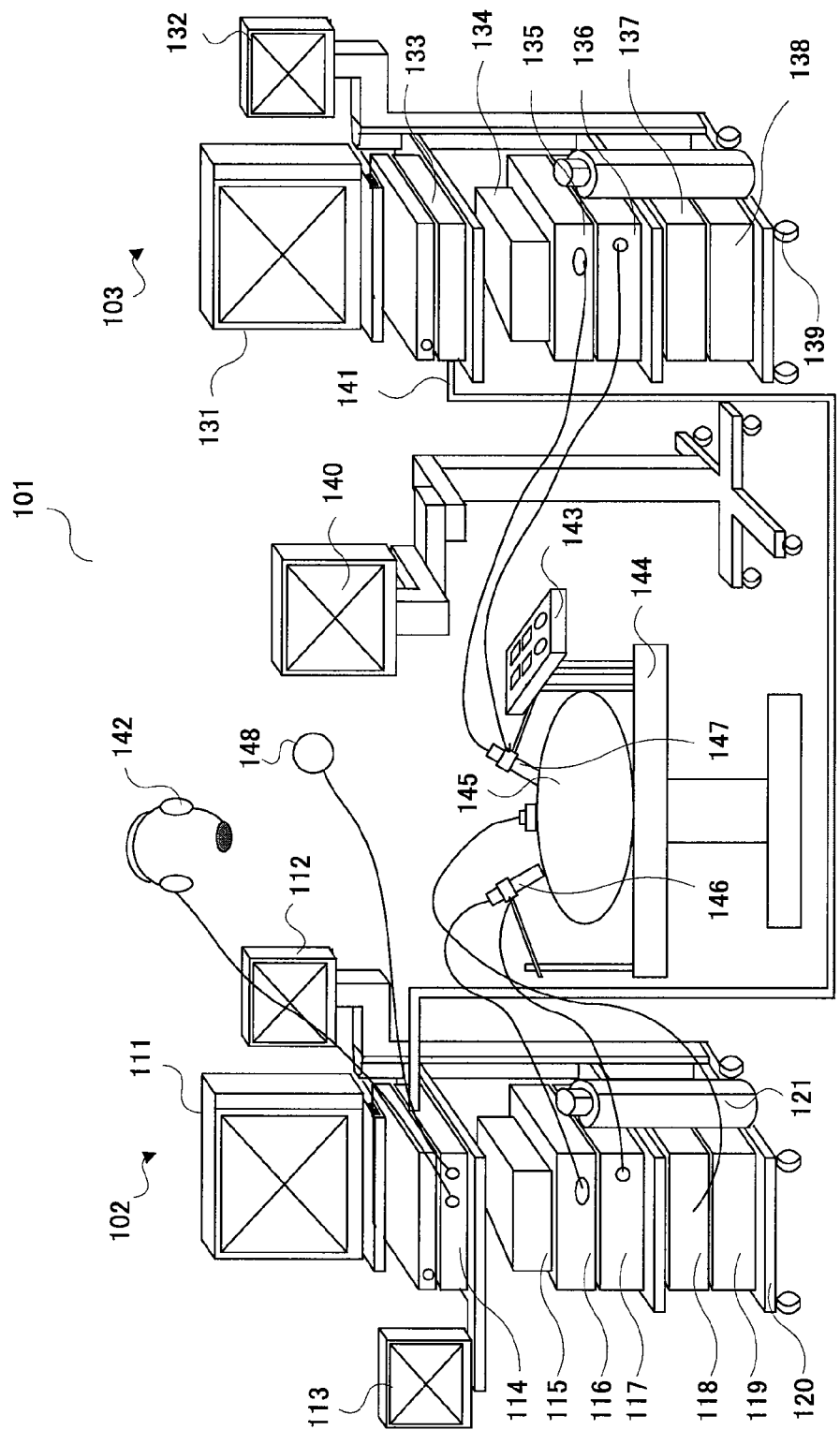
FIG. 1 shows the entire configuration of the endoscope operation system according to the first through third embodiments of the present invention.

FIG. 1 shows the entire configuration of the endoscope operation system according to the present embodiment. An endoscope operation system 101 is provided on both sides of a bed 144 of a patient 145 with a first endoscope operation system 102, a second endoscope operation system 103, and an operator's wireless remote controller 143.

In the endoscope operation systems 102 and 103, a plurality of endoscope peripheral medical devices for performing an observation, inspection, processing, recording, etc. are loaded onto a first trolley 120 and also onto a second trolley 139. A movable stand is loaded with an endoscope display panel 140.

The first trolley 120 includes an endoscope display panel 111, a central display panel 112, a central operation panel device 113, a system controller 114, a recorder 115, a video processor 116, an endoscope light source device 117, an insufflation device 118, and an electrical surgical device 119.

The central operation panel device 113 is arranged in an unsterilized area, and nurses etc. centrally perform operations of medical devices. A mouse, a touch panel, etc. not shown in the attached drawings can be provided for the device. Using the central operation panel device 113, a medical device can be centrally managed, controlled, and operated.

Each medical device is connected to the system controller 114 through a communication cable such as a serial interface cable etc. not shown in the attached drawings to perform bi-directional communications with a system controller.

Additionally, a head set type mike 142 can be connected to the system controller 114. The system controller 114 recognizes the voice input from the head set type mike 142, and can control each device by the voice of an operator. Furthermore, a speaker 148 can be connected to the system controller 114.

The endoscope light source device 117 is connected to a first endoscope 146 through a light guide cable for transmitting illumination light. When the illumination light of the endoscope light source device 117 is supplied to the light guide of the first endoscope 146, it illuminates the affected part etc. in the belly of the patient 145 into which the insertion part of the first endoscope 146 is needled.

The optical image data captured by the camera head of the first endoscope 146 is transmitted to the video processor 116 through the camera cable. The optical image data is signal-processed in the signal processing circuit in the video processor 116, thereby generating a video signal.

The insufflation device 118 provides $CO_2$ gas from a gas bomb 121 inside the belly of the patient 145 through a tube.

The second trolley 139 is loaded with an endoscope display panel 131, a central display panel 132, an expansion unit 133, a recorder 134, a video processor 135, an endoscope light source device 136, and other medical devices 137 and 138 (for example, a ultrasonic processing device, a lithotripsy device, a pump, a shaver, etc.). Each device is connected to the expansion unit 133 via a cable not shown in the attached drawings for bi-directional communications. The system controller 114 is connected to the expansion unit 133 by a relay cable 141.

The endoscope light source device 136 is connected to a second endoscope 147 through a light guide cable for transmitting illumination light. The illumination light of the endoscope light source device 136 is supplied to the light guide of the second endoscope 147. Then, it illuminates the affected part etc. in the belly of the patient 145 into which the insertion part of the second endoscope 147 is needled.

The optical image data captured by the camera head of the second endoscope 147 is transmitted to the video processor 135 through a camera cable. The optical image data is signal-processed by the signal processing circuit in the video processor 135, thereby generating a video signal. Then the video signal is output to the endoscope display panel 131, and an endoscope image of an affected part etc. is displayed on the endoscope display panel 131.

The system controller 114 can also be controlled by the operator's wireless remote controller 143 with which an operator performs the operation of the device from a sterilized area. In addition, the first trolley 120 and the second trolley 139 can be loaded with other devices (for example, a printer, an ultrasonic observation device, etc.).

FIG. 2 is a system wiring diagram of the system controller 114 and the medical devices configuring the endoscope operation system 1. As shown in FIG. 2, the display panel devices 111 and 112, and the central operation panel device 113 are connected to the system controller 114. Also, the head set type mike 142 for inputting voice and the speaker 148 for outputting voice are connected to the system controller 114. Further connected to the system controller 114 are medical devices such as the endoscope light source device 117, the video processor 116, the recorder 115, . . . , the insufflation device 118, operation equipment 119a and 119b, etc. by cable or by wireless.

When the communication system or the communication protocol of a medical device is different from that of the system controller 114, the medical device and the system controller 114 are connected through the communication converter 201. In FIG. 2, the operation equipment A (119a), and the operation equipment B (119b) are connected to the system controller 114 through the communication converter 201.

Figure 3:
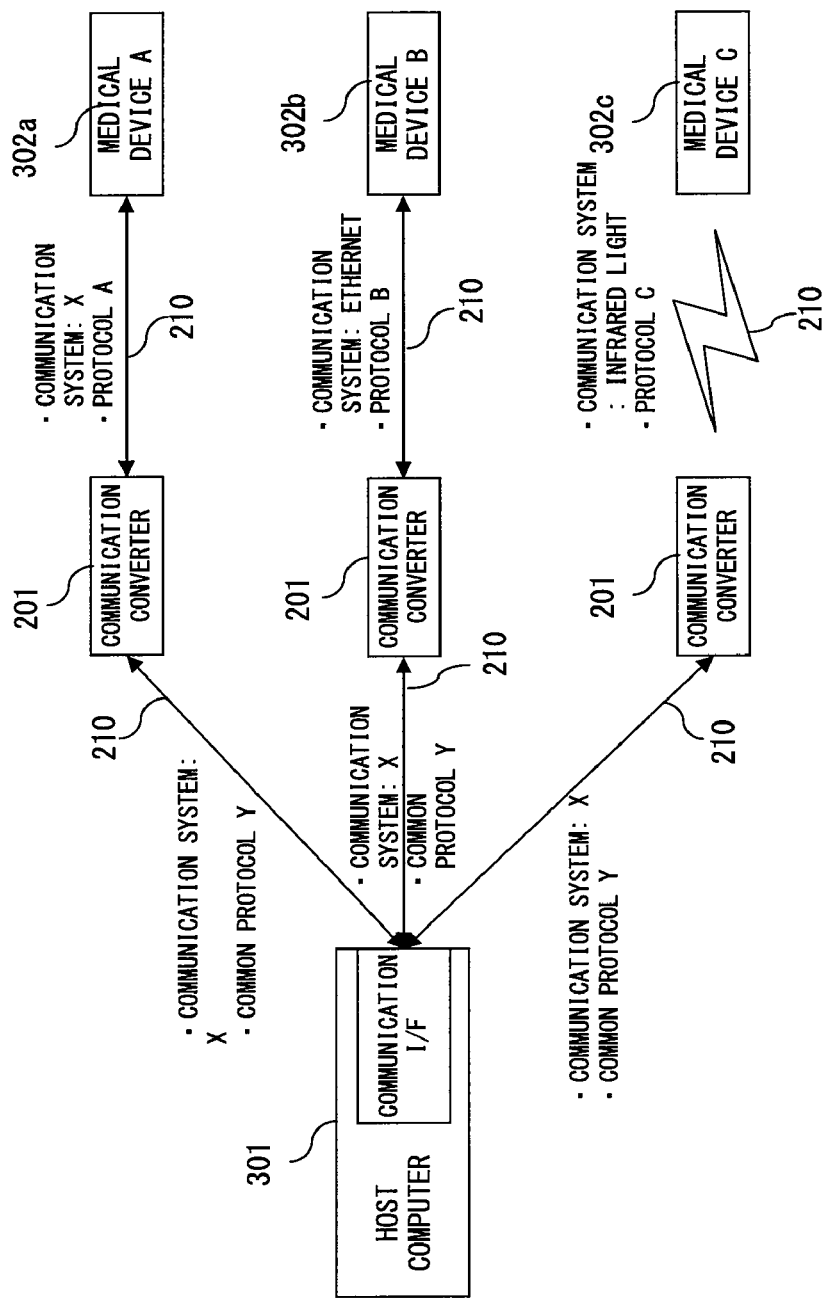
FIG. 3 is an explanatory view of the connection between a host computer and medical devices adopting a communication method or a communication protocol different from the communication method or the communication protocol adopted by the host computer.

FIG. 3 is an explanatory view of the communication converter for converting the communication method and/or the communication protocol between the host computer and the medical device according to the present embodiment. The connection between the host computer and a medical device adopting a communication method or a communication protocol different from the communication method or the communication protocol adopted by the host computer is described below with reference to FIG. 3. A host computer (hereinafter referred to as a host) 301 corresponds to the system controller 114. FIG. 3 shows an example of connecting between the host computer 301 and medical devices 302 (302a, 302b, 302c) using the communication converter 201 capable of communicating with the communication system and the communication protocol of each medical device 302.

The communication converter 201 connects the host computer 301 to the medical device 302 to convert the communication system and/or the communication protocol and enable the communications between the host computer 301 and the medical device 302.

The communication converter 201 is connected to the host computer 301 using a predetermined communication system and a predetermined communication protocol made common on the host computer 301 side. The communication converter 201 is connected to the medical device 302 using a predetermined communication system and a predetermined communication protocol capable of communication with the communication interface (I/F) of each of the medical devices 302a, 302b, and 302c.

In FIG. 3, the communication I/F of the host computer 301 is of communication system X (for example, RS-232C), and can be connected and can establish communications using a predetermined communication protocol (hereinafter referred to as a common protocol) Y.

The communication I/F of the medical device A (302a) is performed in, for example, the communication system X (for example, RS-232C) and uses the communication protocol A. In this case, different communication protocols are going to be used between the host computer 301 and the medical device A (302a). Therefore, the host computer 301 is connected to the medical device A (302a) through the communication converter 201 for converting communication protocols each other.

The communication I/F of the medical device B (302b) is, for example, performed by, for example, Ethernet as a communication system, and the communication protocol B. In this case, the communication systems and the communication protocols are different between the host computer 301 and the medical device B (302b). Therefore, the host computer 301 is connected to the medical device B (302b) through the communication converter 201 for converting the communication system and the communication protocol.

The communication I/F of the medical device C (302c) is, for example, performed by, for example, infrared light communications as a communication system, and the communication protocol C. In this case, the communication systems and the communication protocols are different between the host computer 301 and the medical device C (302c). Therefore, the host computer 301 is connected to the medical device C (302c) through the communication converter 201 for converting the communication system and the communication protocol each other.

Thus, the communication converter 201 can convert the communication system and/or the communication protocol between the host computer 301 and the medical device 302. To realize this, the communication converter 201 is provided with the communication I/Fs respectively capable of communication with the communication I/Fs of the medical devices (302a, 302b, 302c) and the communication programs relating to the communication protocols respectively capable of communication with the communication protocols of the medical devices (302a, 302b, 302c).

Figure 4:
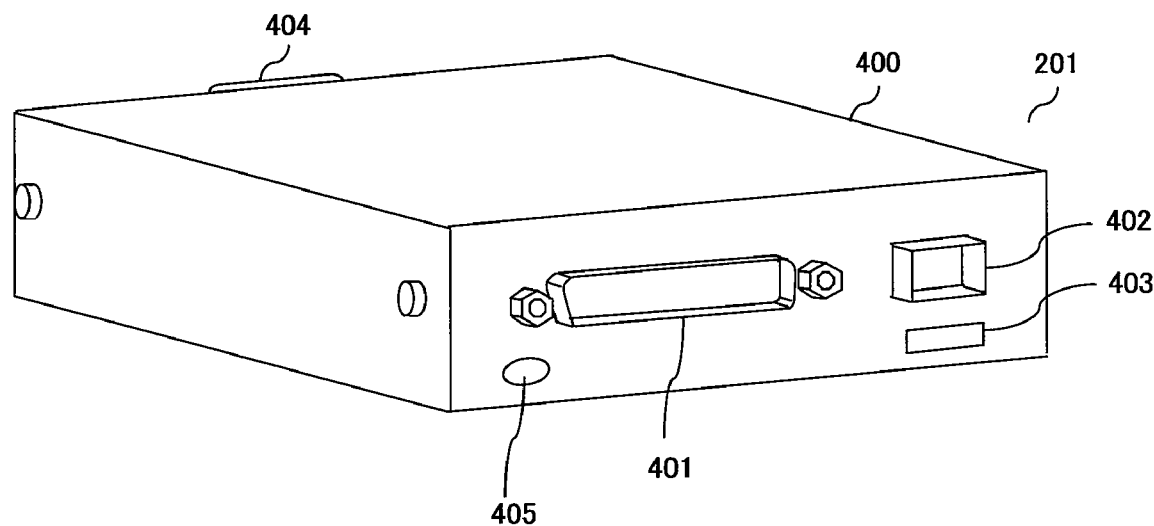
FIG. 4 shows an example of a perspective view of a housing of a communication converter 201 according to the first through third embodiments of the present invention.

FIG. 4 shows an example of a perspective view of the housing of the communication converter 201 according to the present embodiment. The communication I/Fs capable of communication with various communication systems and communication protocols (for example, the infrared light communication I/F, the Ethernet communication I/F, the serial communication I/F, etc.) are provided on the side of a housing 400 of the communication converter 201 to enable connections with the medical devices having various communication systems and communication protocols.

In FIG. 4, as an example, a serial I/F (401), a CAN I/F (402), and an infrared light I/F (403) are provided on the front side of the housing 400. Provided on the back of the housing 400 is a communication I/F 404 corresponding to the communication I/F of the host computer 301 (that is, the system controller 114). The communication I/F provided for the communication converter 201 is not limited to these, but can be any interface of well known standards.

On the front side, an LED (light emitting diode) 405 is provided. As will be described later, the LED 405 notifies a user of an abnormal condition of infrared light communications by turning-on or turning-off.

Figure 5:
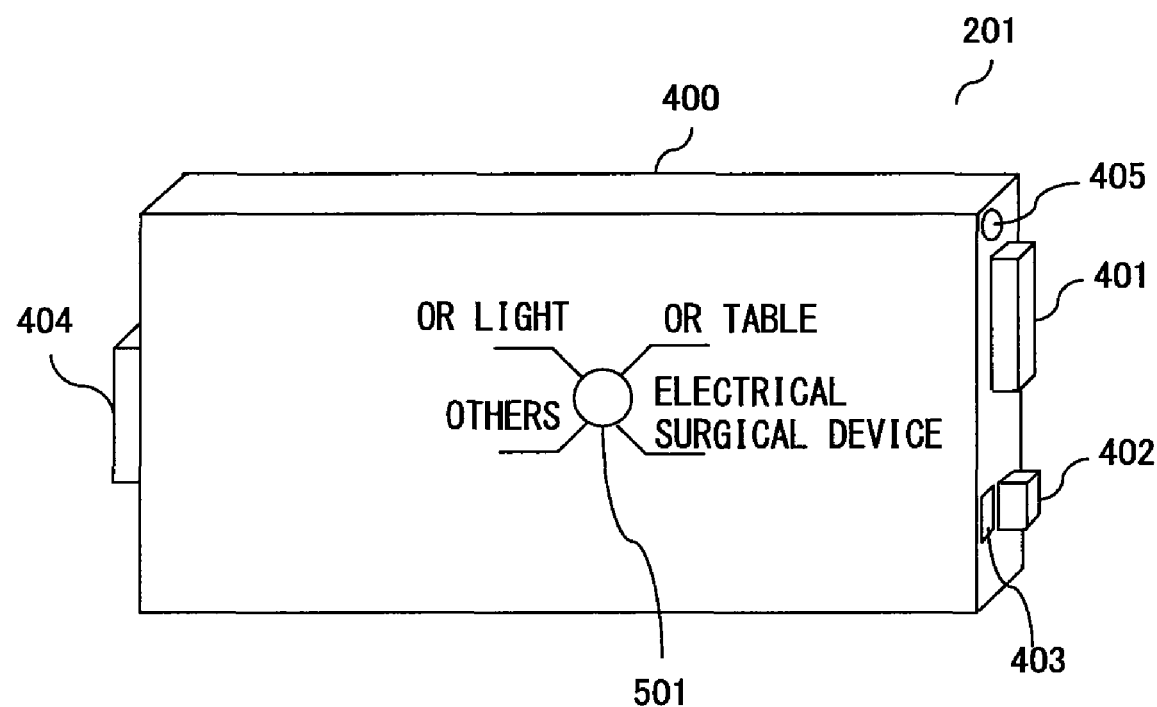
FIG. 5 shows an example of a bottom view of a housing of a communication converter 201 according to the first through third embodiments of the present invention.

FIG. 5 is an example of a bottom view of the housing 400 of the communication converter 201 according to the present embodiment. On the bottom of the communication converter 201, a selection switch 501 for selecting a medical device to be connected is provided. In FIG. 5, a rotary switch is provided as the selection switch 501. Using the selection switch 501, for example, an "operating table", an "electrical surgical device", an "astral lamp", and "others" categories indicating medical devices to be connected can be selected. The communication converter 201 downloads a communication program corresponding to the communication protocol of the medical device of the selected category. For example, when the "electrical surgical device" is selected using the selection switch 501, the communication converter 201 can download the communication program relating to the communication protocol of the medical equipment "electrical surgical device" from the host computer 301 in advance.

Figure 6:
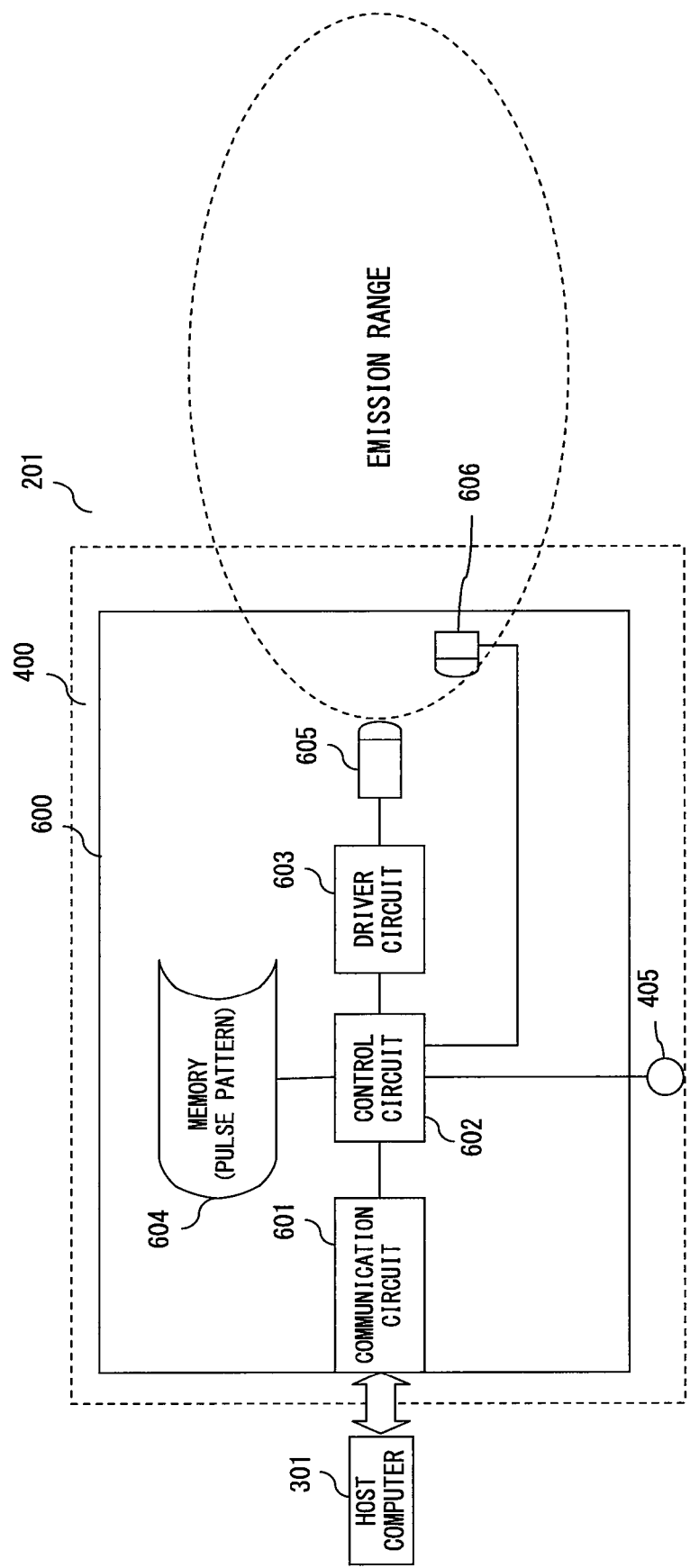
FIG. 6 shows the outline of the internal configuration of the communication converter 201 according to the first embodiment of the present invention.

FIG. 6 shows the outline of the internal configuration of the communication converter 201 according to the present embodiment. On the substrate 600 in the housing 400 of the communication converter 201, a communication circuit 601, a control circuit 602, a driver circuit 603, memory 604, an infrared light emission unit 605, and an infrared light reception unit 606 are provided.

The communication circuit 601 controls the communications with the host computer 301 by outputting data to the host computer 301 and inputting data provided from the host computer 301.

The memory 604 stores a program relating to the present embodiment, a communication program downloaded from the host computer 301, and other programs. Furthermore, the memory 604 stores a pulse pattern for transmitting a control signal from the host computer 301 using infrared communication carrier wave. The memory 604 can be, for example, a ROM, a RAM, a hard disk drive, a flash memory, etc. The memory 604 is stored in the communication converter 201 according to the present embodiment, but it is not limited to this application, and can be externally provided (for example, a portable storage media such as a USB memory, an SD memory card, etc.).

The control circuit 602 is a central processing device for controlling the operation of each component configuring the communication converter 201, and reading and executing the program stored in the memory 604. The driver circuit 603 allows the infrared light emission unit 605 to emit infrared light based on a pulse pattern. The infrared light reception unit 606 is provided in an emission range of the infrared light emission unit 605, receives infrared light from the infrared light emission unit 605, and transmits a reception result to the control circuit 602.

The communication converter 201 further includes a device side input/output I/F (not shown in the attached drawings) corresponding to a device side communication I/F of the medical device 302 etc. The device side input/output I/F can be the serial I/F (401), the CAN I/F (402), and an infrared light communication I/F for receiving an infrared light signal transmitted from the medical device 302 as shown in FIGS. 4 and 5.

Figure 7:
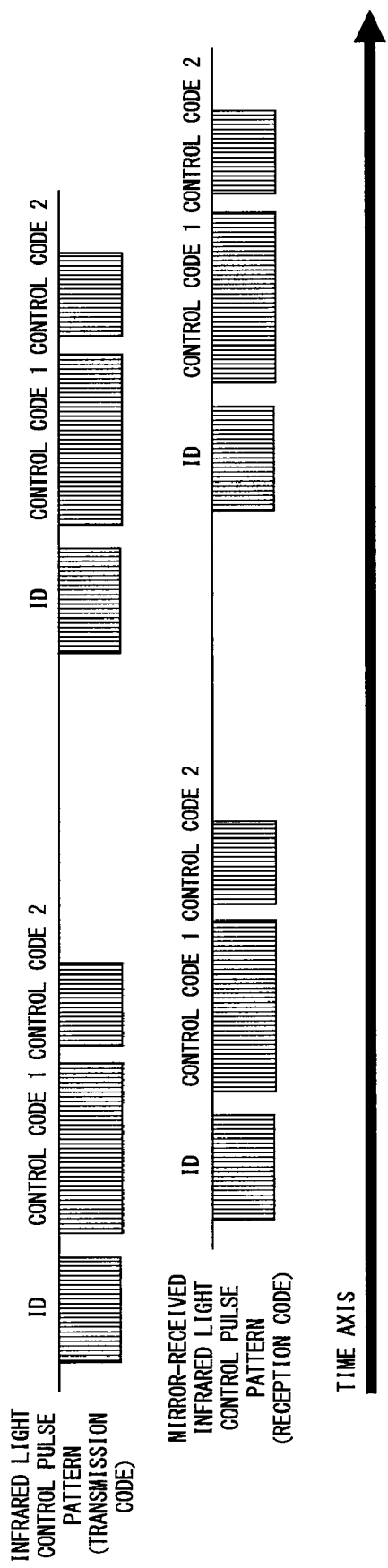
FIG. 7 shows an example of a pulse pattern transmitted by an infrared light emission unit 605 according to the first embodiment and a pulse pattern received by an infrared light reception unit 606.

FIG. 7 shows an example of a pulse pattern transmitted by the infrared light emission unit 605 and a pulse pattern received by the infrared light reception unit 606. An infrared light control pulse pattern is configured by, for example, an ID identifying a medical device, a control code 1 for controlling the function of the medical device, and a control code 2 indicating the vender code of the medical device.

The pulse pattern in the upper drawing indicates the infrared light control pulse pattern (transmission code) transmitted by the emission of the infrared light emission unit 605. The pulse pattern in the lower pulse pattern indicates the infrared light control pulse pattern (reception code) which is the mirror-received transmission code.

Figure 8:
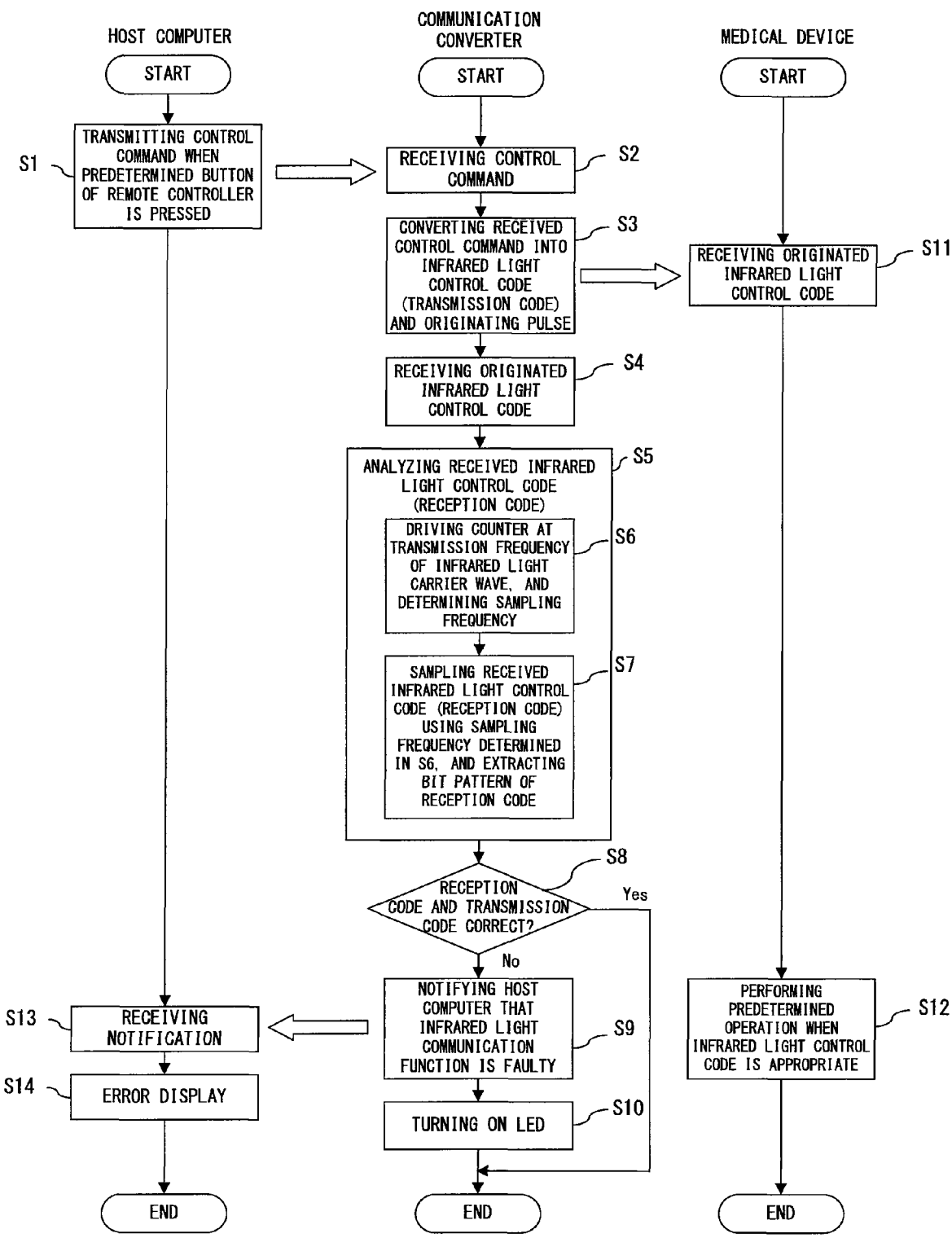
FIG. 8 is an infrared light mirror reception analysis flow according to the first embodiment of the present invention.

FIG. 8 is an infrared light mirror reception analysis flow according to the present invention. The flow shown in FIG. 8 is described below with reference to FIGS. 6 and 7. When a predetermined button of the remote controller 143 is pressed, the host computer 301 transmits a control signal to the communication converter 201 according to the instruction transmitted from the remote controller 143 (S1).

The communication converter 201 receives the control signal from the host computer 301 (S2). The control signal received by the communication converter 201 is transmitted to the control circuit 602 through the communication circuit 601.

The control circuit 602 converts the control signal into an infrared light control code (transmission code), and allows the infrared light emission unit 605 to transmit a pulse by controlling the driver circuit 603 (S3). Practically, the control circuit 602 interprets the control signal from the host computer 301, reads the pulse pattern data corresponding to the control signal from the memory 604, and converts the received control signal to an infrared light control code (transmission code) based on the read pulse pattern data. The control circuit 602 transmits the transmission code to the driver circuit 603. At this time, the control circuit 602 holds the transmission code. The driver circuit 603 allows the infrared light emission unit 605 to emit light based on the transmission code. Thus, the control signal from the host computer 301 can be transmitted to the medical device 302 through the infrared light carrier wave.

The infrared light reception unit 606 receives the infrared light control code by the emission of the infrared light emission unit 605 and transmits the received infrared light control code (reception code) to the control circuit 602 (S4).

The control circuit 602 analyzes the received infrared light control code (reception code). First, the control circuit 602 drives a counter at the transmission frequency of the infrared light carrier wave, and determines a sampling frequency (S6). At this time, a plurality of counters can be driven with different timings to determine the sampling frequency.

The control circuit 602 samples the reception code at the sampling frequency determined in S6, and extracts a bit pattern of the reception code (S7). At this time, a plurality of sampling operations can be performed with different timings to extract a bit pattern of the reception code.

Then, the control circuit 602 compares the bit pattern of the transmission code with the bit pattern of the reception code, and determines whether or not they match each other (S8). When the transmission code and the reception code match in S8 (YES in S8), it means that an appropriate infrared light control code has been transmitted to the medical device 302, the control circuit 602 does not perform a special process. In this case, the medical device 302 receives an infrared light control code (S11) and if the infrared light control code is appropriate, the medical device 302 performs a desired operation (S12).

When the transmission code and the reception code do not match each other in S8 (NO in S8), it means an inappropriate infrared light control code has been transmitted to the medical device 302, the control circuit 602 notifies the host computer 301 that a fault has occurred in the infrared light communication function (S9, S13). The host computer 301 displays a message that a fault has occurred in the infrared light communication function on the display panel etc. (S14). Furthermore, the control circuit 602 allows the LED 405 to be changed from a turning-off state to a turning-on state (or from the turning-on state to the turning-off state, or a blinking state, etc.), thereby notifying the user of an abnormal condition of the infrared light communication. (S10).

According to the present embodiment, it can be easily determined whether or not the infrared light communication function is valid. In the present embodiment, infrared light communication between the communication converter 201 and the medical device 302 is described, but the present invention is not limited to this application, and can be applied to infrared light communication between the host computer 301 and the remote controller 143 operating the host computer, and infrared light communication with the another equipment. In addition, a plurality of infrared light emission units 605 can be loaded.

Second Embodiment

In the infrared light communication, data is normally transmitted in burst waves. However, since the burst waves are high frequency waves, the infrared light control signal is sampled to extract a bit pattern, thereby increasing the load on the control circuit of the communication converter. Therefore, a control circuit of a high performance specification is requested in the first embodiment.

Therefore, the present embodiment provides a communication converter capable of easily determining whether or not the infrared light communication function is valid in the method in which a load on the control circuit is reduced than in the first embodiment. Since the operation environment of the present embodiment is similar to that shown in FIGS. 1 through 5, the description is omitted here. The components described with reference to the first embodiment are assigned the same reference numerals, and the description is omitted here also.

Figure 9:
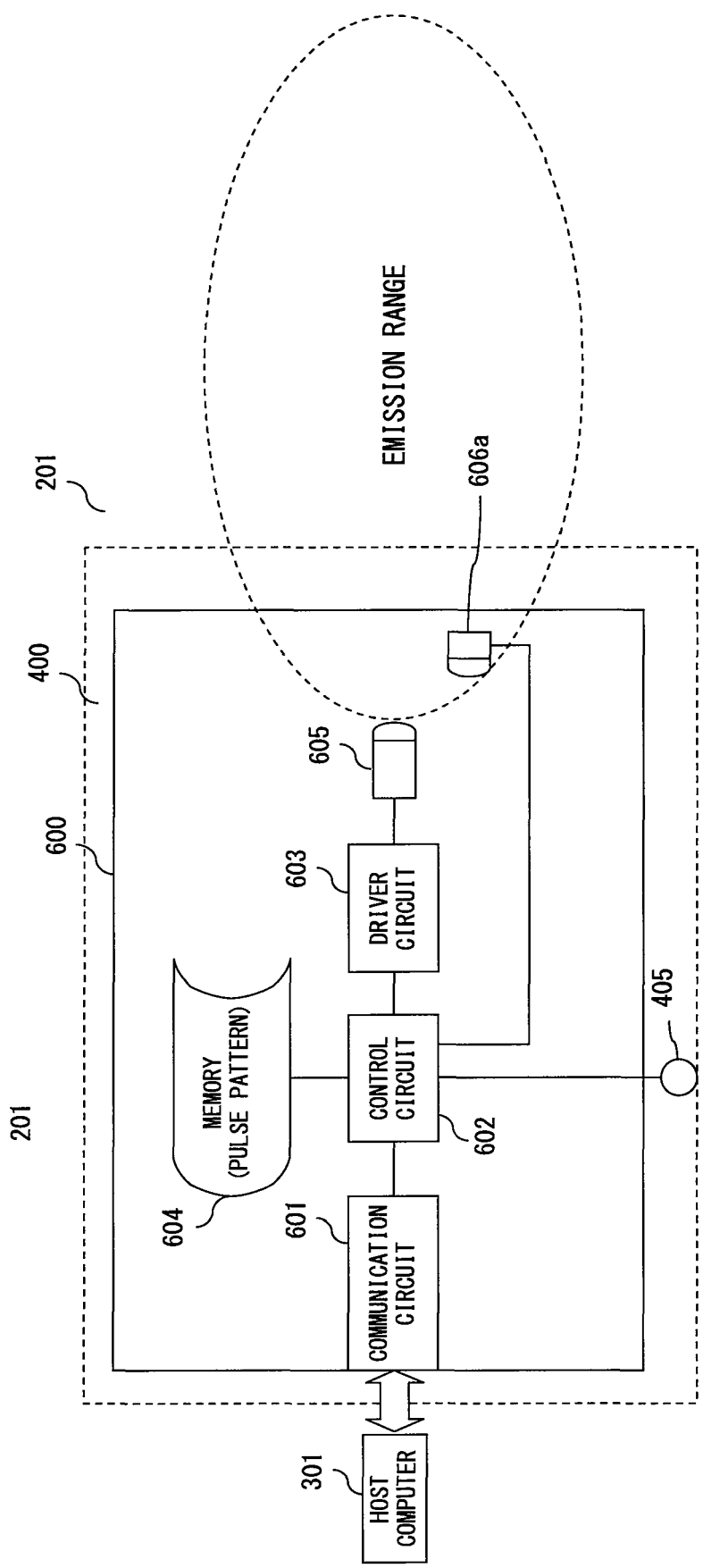
FIG. 9 shows the outline of the internal configuration of the communication converter 201 according to the second embodiment of the present invention.

FIG. 9 shows the outline of the internal configuration of the communication converter 201 according to the present embodiment. FIG. 9 shows the configuration similar to the configuration shown in FIG. 6 except an infrared light reception unit 606a. The infrared light reception unit 606a can receive infrared light in a predetermined frequency band lower than the high frequency of the infrared light control pulse signal.

The control circuit 602 converts a control signal from the host computer 301 to an infrared light control code (transmission code) based on the pulse pattern stored in the memory 604. Then, the control circuit 602 controls the driver circuit 603 and transmits an infrared light control code using a first frequency. Furthermore, the control circuit 602 transmits a predetermined pulse code (fault detecting pulse code) using a second frequency lower than the first frequency.

Figure 10:
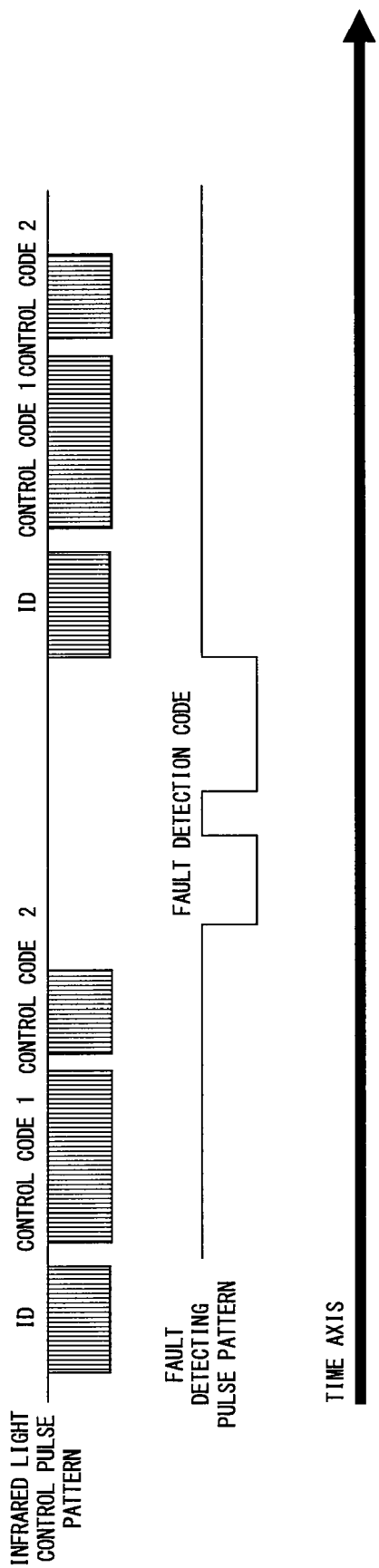
FIG. 10 shows an example of an infrared light control pulse pattern transmitted at a first frequency according to the second embodiment, and a fault detecting pulse pattern transmitted at a second frequency.

FIG. 10 shows an example of an infrared light control pulse pattern transmitted at the first frequency, and a fault detecting pulse pattern transmitted at the second frequency according to the present embodiment. Since the infrared light control pulse pattern is similar to the infrared light control pulse pattern in the upper drawing shown in FIG. 7, the description is omitted here. The fault detecting pulse pattern is asynchronous with the infrared light control pulse pattern. And the fault detecting pulse pattern is periodical.

Figure 11:
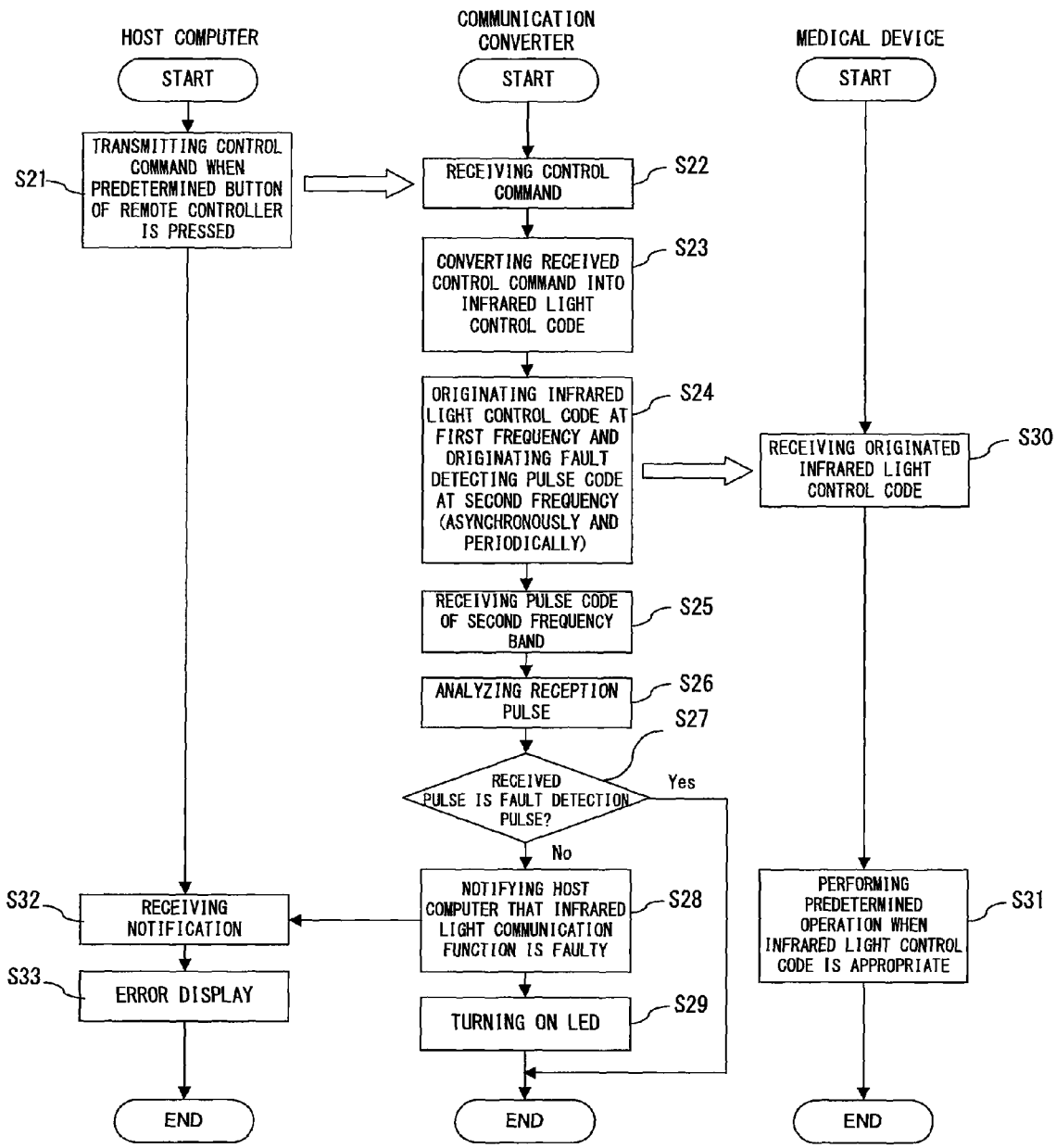
FIG. 11 is an infrared light fault pulse detection flow according to the second embodiment of the present invention.

FIG. 11 is an infrared light fault pulse detection flow according to the present embodiment. The flow shown in FIG. 11 is described below with reference to FIGS. 9 and 10. When a predetermined button of the remote controller 143 is pressed, the host computer 301 transmits a control signal to the communication converter 201 at an instruction transmitted from the remote controller 143 (S21).

The communication converter 201 receives the control signal from the host computer 301 (S22). The control signal received from the communication converter 201 is transmitted to the control circuit 602 through the communication circuit 601.

The control circuit 602 interprets the control signal from the host computer 301, reads the pulse pattern data corresponding to the control signal from the memory 604, and converts the control command received based on the read pulse pattern data into an infrared light control code (transmission code) (S23).

The control circuit 602 controls the driver circuit 603 and allows the infrared light emission unit 605 to emit light. That is, the control circuit 602 transmits a transmission code using the first frequency. Furthermore, the control circuit 602 allows the infrared light emission unit 605 to transmit a fault detecting pulse code using the second frequency lower than the first frequency (S24). Thus, the control signal from the host computer 301 can be transmitted to the medical device 302 using an infrared light carrier wave.

When the infrared light reception unit 606a receives a pulse code of the second frequency band (S25), it transmits the received pulse code (reception code) to the control circuit 602. The control circuit 602 performs sampling at the frequency of the fault detecting pulse code, extracts the bit pattern of the reception code, and analyzes whether or not the bit pattern of the reception code matches the bit pattern of the fault detecting pulse code (S26). Based on the analysis result, the control circuit 602 determines whether or not the received pulse code is a fault detecting pulse code (S27).

If the bit pattern of the reception code matches the bit pattern of the fault detecting pulse code, then it is determined that the received infrared light control code is a fault detecting pulse code. In this case (YES in S27), it means that an appropriate infrared light control code has been transmitted to the medical device 302, and the control circuit 602 does not perform a special process. In this case, the medical device 302 receives an infrared light control code (S30), and if the infrared light control code is appropriate, a predetermined operation is performed (S31).

On the other hand, if the bit pattern of the reception code does not match the bit pattern of the fault detecting pulse code (NO in S27), then it means that the infrared light control code has not been correctly transmitted to the medical device 302, and the control circuit 602 notifies the host computer 301 that a fault has occurred in the infrared light communication function (S28, S32). The host computer 301 displays a message that a fault has occurred in the infrared light communication function on the display panel etc. (S33). Furthermore, the control circuit 602 turns on the LED 405 from the turning-off state (or turns off the LED 405 from the turning-on state, or blinks it), thereby notifying the user of the abnormal condition of infrared light communication (S29).

According to the present embodiment, it can be easily determined whether or not the infrared light communication function is valid at a lower performance specification and lower cost than in the first embodiment. In the present embodiment, infrared light communication between the communication converter 201 and the medical device 302 has been described, but the present invention is not limited to this application, and can be applied to infrared light communication between the host computer 301 and the remote controller 143 operating the host computer, and infrared light communication with the another equipment. In addition, a plurality of infrared light emission units 605 can be loaded.

In addition, regardless of issuing an infrared light control code, only a fault detecting pulse code can be periodically transmitted. Thus, before operating the medical device 302, it can be determined whether or not the infrared light communication function is valid. As a result, when the infrared light communication function is out of order, it can be quickly repaired.

Third Embodiment

In the above-mentioned embodiment, the communication converter for detecting a fault of an infrared light communication function based on the timing of originating the infrared light control code for operating a medical device is described. In the present embodiment, a communication converter capable of making a self-check before operating a medical device as to whether or not an infrared light communication function is valid is described. Since the operation environment of the present embodiment is similar to that shown in FIGS. 1 to 5, the description is omitted here. The components also described in the second embodiment are assigned the same reference numerals, and the description is omitted here.

Figure 12:
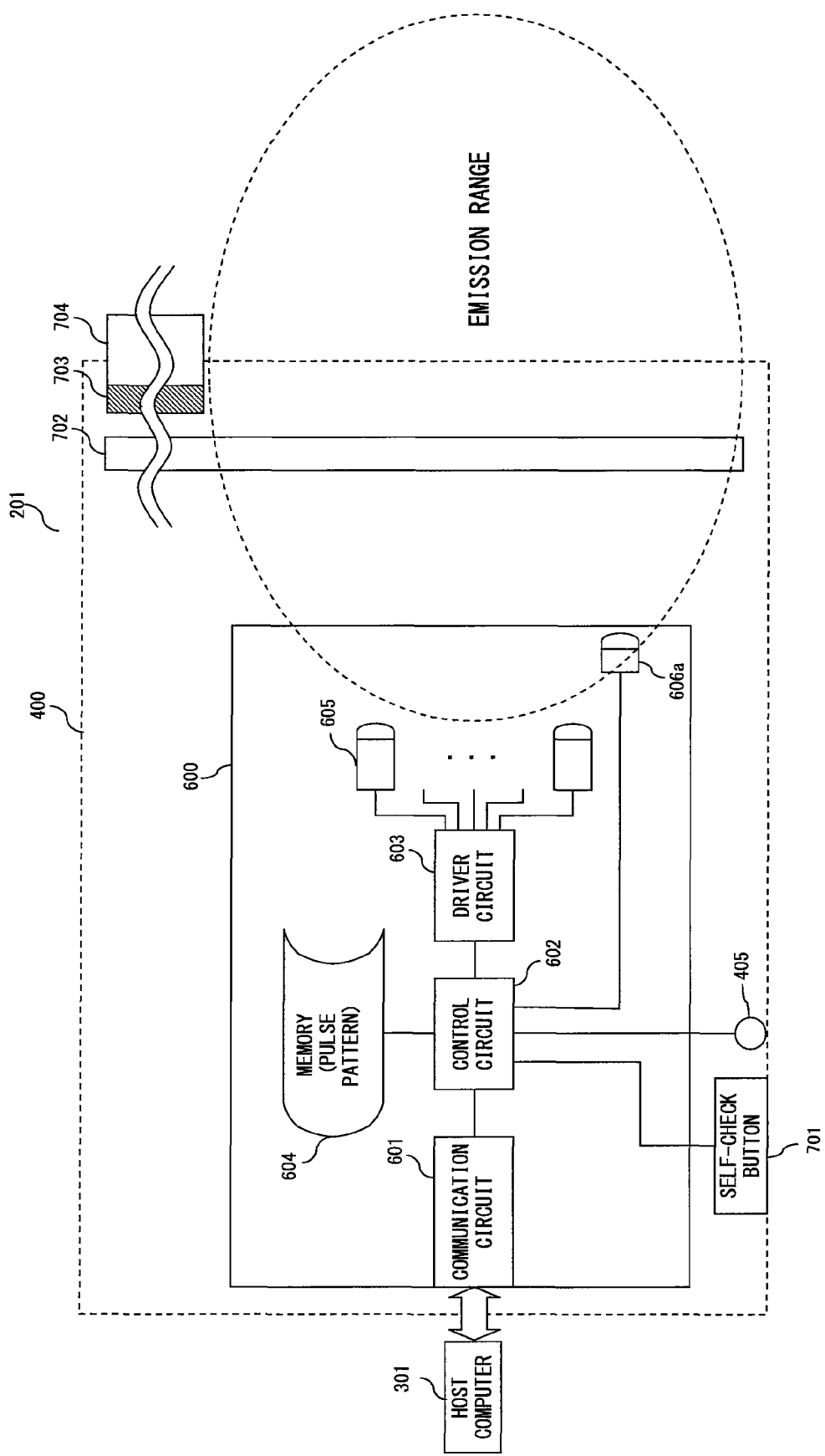
FIG. 12 shows the outline of the internal configuration of the communication converter 201 when a shutter is open according to the third embodiment of the present invention.

FIG. 12 shows the outline of the internal configuration of the communication converter 201 when a shutter is open according to the present embodiment. The communication converter 201 includes the substrate 600, the LED 405, a self-check button 701, an infrared light filter 702, and a shutter 704. The self-check button 701 is provided with the communication circuit 601, the control circuit 602, the driver circuit 603, the memory 604, a plurality of infrared light emission units 605, the infrared light reception unit 606a. A reflection plate 703 is provided on the surface of the inside of the housing of the shutter 704.

The infrared light reception unit 606 is provided at a point where only infrared light emitted by the infrared light emission unit 605 and reflected by a reflection plate 703 is received, and the infrared light is not received directly from the infrared light emission unit 605. As in the second embodiment, the infrared light reception unit 606a can receive infrared light at a predetermined frequency lower than the infrared light control pulse signal.

When the self-check button 701 is pressed, a self-check mode is enabled, and a self-check process is performed. When the self-check button 701 is pressed, the control circuit 602 checks whether or not each infrared light emission unit 605 is faulty.

The infrared light filter 702 removes all but the wavelengths close to the band used in infrared light communication, and passes the infrared light. The shutter 704 opens and closes the aperture of the infrared light I/F (403). The reflection plate 703 reflects infrared light. In FIG. 12, since the shutter 704 is open, the infrared light emitted from the infrared light emission unit 605 is radiated within a predetermined emission range.

Figure 13:
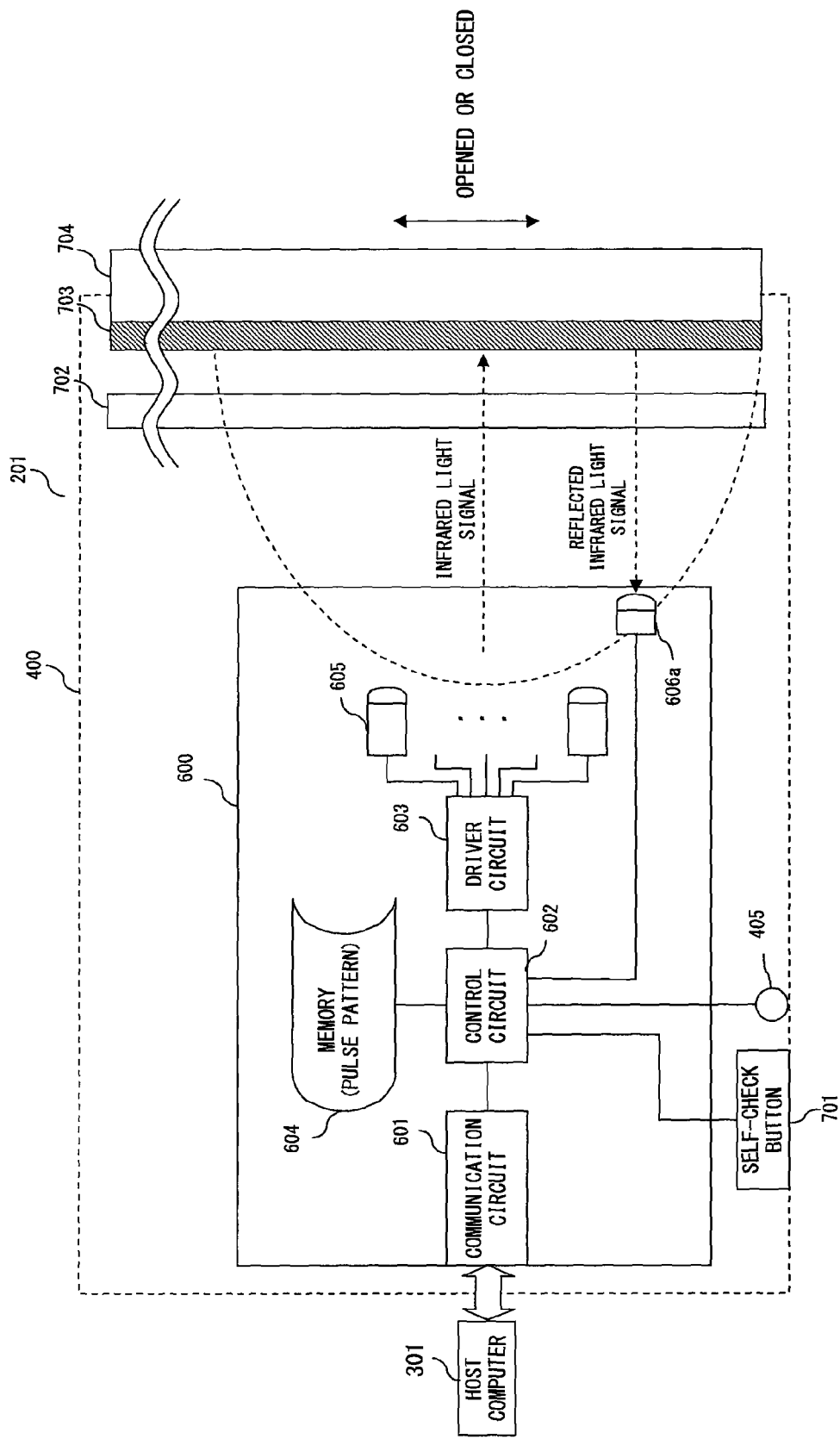
FIG. 13 shows the outline of the internal configuration of the communication converter 201 when a shutter is closed according to the third embodiment of the present invention.

FIG. 13 shows the outline of the internal configuration of the communication converter 201 when the shutter is closed according to the present embodiment. In FIG. 13, the shutter 704 is closed, and the infrared light emitted from the infrared light emission unit 605 does not leak outside from the infrared light I/F (403).

Each of the infrared light emission unit 605 can be driven one by one in the self-check mode. In this case, the infrared light emitted from the infrared light emission unit 605 is reflected by the reflection plate 703, and received by the infrared light reception unit 606a.

Figure 14:
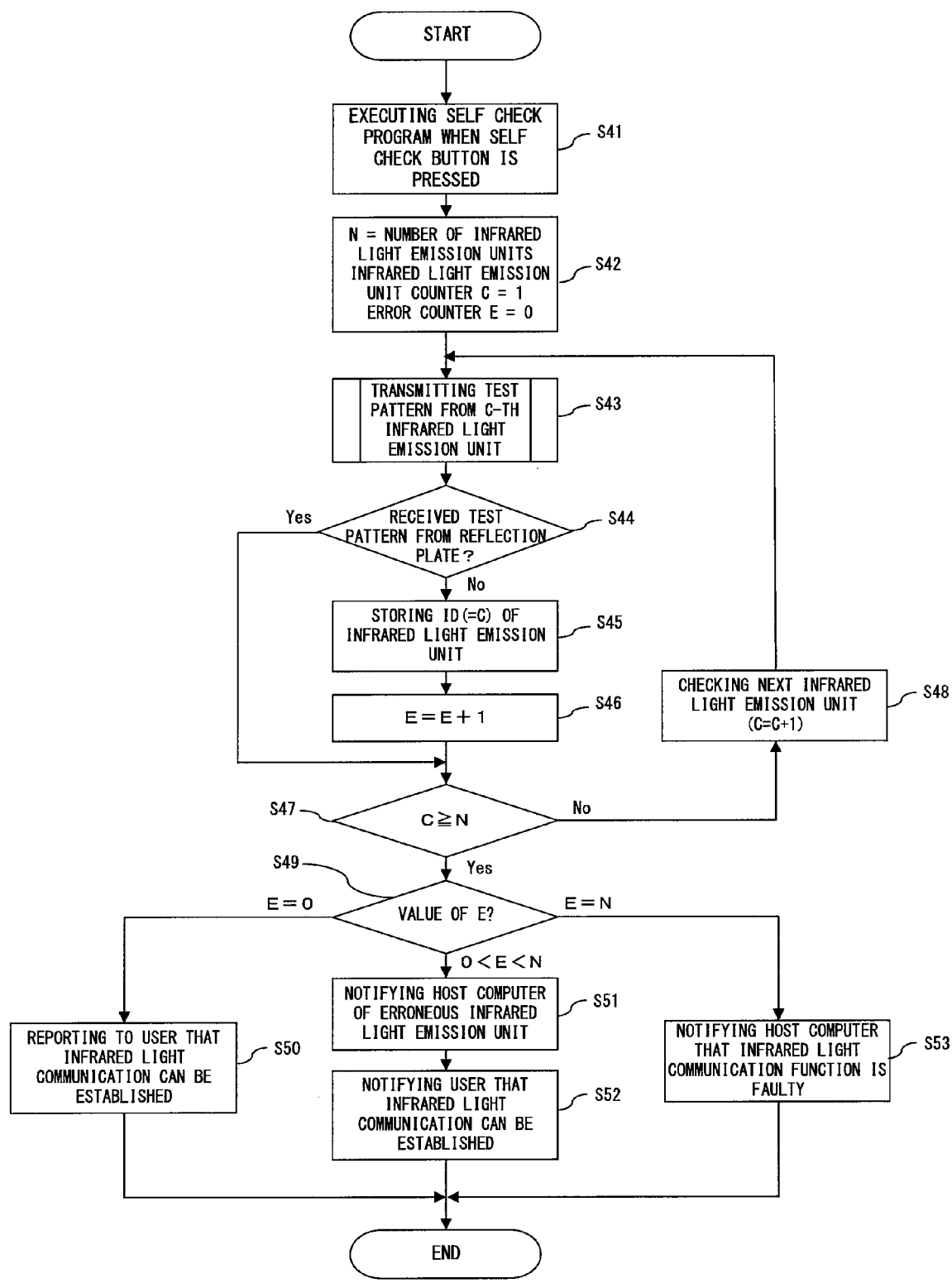
FIG. 14 is an infrared light fault self check flow according to the third embodiment of the present invention.

FIGS. 14 and 15 are infrared light fault self check flows according to the present embodiment. The user closes the shutter 704, and presses the self-check button 701. Then, the control circuit 602 executes a self-check program (S41). The control circuit 602 is initialized with the variable N=a total number of infrared light emission units, the infrared light emission unit counter C=1, and the error counter E=0 (S42).

First, a test pattern is transmitted from the C-th infrared light emission unit 605 (S43). The process in S43 is described below with reference to FIG. 15. The control circuit 602 controls the driver circuit 603 to allow the C-th infrared light emission unit 605 to emit light. That is, the control circuit 602 allows the C-th infrared light emission unit 605 to periodically transmit an infrared light signals indicating a test pattern using the second frequency described in the second embodiment (S43-1).

An infrared light signal transmitted by the C-th infrared light emission unit 605 is reflected by the reflection plate 703 and received by the infrared light reception unit 606*a* (S43-2). Upon receipt of the infrared light signal of the second frequency band, the infrared light reception unit 606*a* transmits the signal to the control circuit 602.

The control circuit 602 performs sampling on the infrared light signals at the frequency of the transmitted test pattern, extracts a bit pattern of the infrared light signals, and analyzes as to whether or not the bit pattern of the received infrared light signals matches the bit pattern of the transmitted infrared light signals (S43-3).

Based on the analysis result, the control circuit 602 determines whether or not a test pattern has been received from the reflection plate 703 (S44). When the bit pattern of the received infrared light signals matches the bit pattern of the transmitted infrared light signals (YES in S44), the control circuit 602 determines that a test pattern has been received from the reflection plate 703 (that is, the infrared light emission unit 605 correctly functions), thereby passing control to step S47.

On the other hand, if the infrared light reception unit 606*a* cannot receive the infrared light signal, or the received infrared light signals are not of a pulse code of a test pattern, it means that the C-th infrared light emission unit 605 is faulty, then the control circuit 602 stores the information identifying the C-th infrared light emission unit 605 (S45), and increments an error counter E (S46).

If the infrared light emission unit counter C<the total number N of the infrared light emission units (NO in S47), then the C is incremented, and the next infrared light emission unit 605 is checked (S48). The processes in S43 through S48 are repeated until the infrared light emission unit counter C reaches or exceeds the total number N of the infrared light emission units.

When the infrared light emission unit counter C reaches or exceeds the total number N of the infrared light emission units (YES in S47), the control circuit 602 confirms the value of the error counter E (S49). When E=0, all infrared light emission units 605 normally function, and the control circuit 602 turns on the LED 405, thereby notifies the user that infrared light communications can be established (S50). In addition, the control circuit 602 notifies the host computer 301 that all infrared light emission units 605 normally function.

When 0<E<N, the control circuit 602 notifies the host computer 301 of faulty infrared light emission unit or units 605 based on the contents stored in S45 (S51). The host computer 301 displays the notification contents on display panel. The control circuit 602 turns on the LED 405, thereby notifies the user that infrared light communication can be established (S52). Thus, the user can designate the faulty infrared light emission unit 605 in advance, thereby guaranteeing the time interval to replace the infrared light emission unit.

When E=N, all infrared light emission units 605 are faulty, and the control circuit 602 notifies the host computer 301 that the infrared light communication function is faulty based on the contents stored in S45 (S53). The host computer 301 displays the notification contents on the display panel. In addition, the control circuit 602 blinks the LED 405 to notify the user that infrared light communication cannot be established (S54).

If the self check is completed and infrared light communication can be established, the user opens the shutter 704, and performs a predetermined operation, thereby starting infrared light communication between the communication converter 201 and medical device.

In S43, since the shutter 704 closes not to admit an external infrared light signal to enter, and the infrared light emission units 605 is operated one by one, it can be stated that a signal received by the infrared light reception unit 606*a* is an infrared light signal transmitted by the infrared light emission unit 605. Then, according to the present embodiment, it can be determined upon receipt of an infrared light signal by the infrared light reception unit 606*a* that the signal received is a pulse code of a test pattern.

The present embodiment can be combined with the second embodiment. That is, when a fault check is performed on infrared light communication before operating a medical device, the third embodiment can be applied, and when a fault check is performed on infrared light communications during the infrared light communication with a medical device, the second embodiment can be applied. In addition, in the third embodiment, a shutter can be manually opened or closed, but the present invention is not limited to this application. For example, when a self check button is pressed, a shutter can be automatically closed and can be opened when a self check process is completed.

According to the present embodiment, it can be easily determined whether or not the infrared light communication function is valid by a lower performance specification and lower cost than in the first embodiment. Additionally, a communication function of infrared light communication equipment can be checked more easily to operate and safely by a user. In the present embodiment, infrared light communication between the communication converter 201 and the medical device 302 is described, but the present invention is not limited to this application, and can be applied to infrared light communication between the host computer 301 and the remote controller 143 operating the host computer, and infrared light communication with the another equipment.

In infrared light communication according to the second and third embodiments, a remote control device for controlling a medical device or a medical control device for controlling the medical device includes an infrared light emission unit, a control unit, and an infrared light reception unit. The infrared light emission unit (for example, corresponding to the reference numeral 605) emits infrared light for performing infrared light communication. The control unit (for example, corresponding to the reference numeral 602) allows the infrared light emission unit to emit first infrared light for conveying control information for control of the medical device, and second infrared light conveying predetermined information and having a frequency different from that of the first infrared light. The infrared light reception unit (for example, corresponding to the reference numeral 606*a*) receives infrared light emitted from the infrared light emission unit. At this time, the control unit determines whether or not the infrared light received by the infrared light reception unit is the second infrared light. The control unit can also make the infrared light emission unit emit the second infrared light periodically. The control unit can further allow the infrared light emission unit to emit the second infrared light asynchronously with the emission of the first infrared light.

Thus, if it is determined that the infrared light received by the infrared light reception unit is the second infrared light, it can be confirmed that the infrared light reception unit normally functions.

There can be a plurality of infrared light emission units. In this case, the control unit sequentially allows the infrared light emission units to emit the second infrared light.

Thus, it can be checked whether or not each infrared light emission unit is faulty.

The remote control device further includes a reflection unit and a shutter unit. The reflection unit (for example, corresponding to the reference numeral 703) reflects the second infrared light emitted from the infrared light emission unit. The shutter unit (for example, corresponding to the reference numeral 704) is provided with the reflection unit, and thereby can cut off the emission direction of the infrared light. When the shutter unit is closed, the infrared light reception unit can receive only the infrared light reflected by the reflection unit.

Thus, it can be checked before operating a medical device whether or not each of the infrared light emission units is faulty.

The remote control device can further include a reporting unit (for example corresponding to the reference numeral 405) for reporting an abnormal condition of the infrared light emission units based on the determination result. Thus, the user can easily determine that an infrared light emission unit is faulty.

The remote control device can be a communication converter for converting a communication system and/or a communication protocol for enabling the communications between the medical device and the medical control device, or can be a remote controller for controlling the medical control device.

What is claimed is:

1. A remote control device which controls a medical device or a medical control device for controlling the medical device by infrared light communication, comprising:
    an infrared light emission unit emitting infrared light for infrared light communication;
    a control unit allowing the infrared light emission unit to emit first infrared light for conveying control information for control of the medical device, and second infrared light conveying predetermined information, and having a frequency different from that of the first infrared light; and
    an infrared light reception unit receiving the infrared light emitted from the infrared light emission unit, wherein
    the control unit determines whether or not the infrared light received by the infrared light reception unit is the second infrared light.

2. The remote control device according to claim 1, wherein the control unit allows the infrared light emission unit to periodically emit the second infrared light.

3. The remote control device according to claim 2, wherein the control unit further allows the infrared light emission unit to emit the second infrared light asynchronously with emission of the first infrared light.

4. The remote control device according to claim 1, wherein there are a plurality of infrared light emission units; and the control unit sequentially allows the infrared light emission unit to emit the second infrared light.

5. The remote control device according to claim 4, further comprising
    a reflection unit reflecting the second infrared light emitted from the infrared light emission unit; and
    a shutter unit provided with the reflection unit and capable of shading an emission direction of the infrared light.

6. The remote control device according to claim 5, wherein when the shutter unit is closed, the infrared light reception unit receives only infrared light reflected by the reflection unit.

7. The remote control device according to claim 1, further comprising
    a reporting unit for reporting an abnormal condition of the infrared light emission unit based on a determination result.

8. The remote control device according to claim 1, wherein the remote control device is a communication converter converting a communication system and/or a communication protocol for enabling communications between the medical device and the medical control device.

9. The remote control device according to claim 1, wherein the remote control device is a remote controller controlling the medical control device.

10. A remote control system associated with a medical device, a medical control device for controlling the medical device, and a remote control device for controlling the medical device or the medical control device by infrared light communications, wherein:
    the remote control device includes:
    an infrared light emission unit emitting infrared light for performing infrared communication;
    a control unit allowing the infrared light emission unit to emit first infrared light for conveying control information for control of the medical device, and second infrared light conveying predetermined information, and having a frequency different from that of the first infrared light; and
    an infrared light reception unit receiving the infrared light emitted from the infrared light emission unit; and
    the control unit determines whether or not the infrared light received by the infrared light reception unit is the second infrared light.

11. The remote control system according to claim 10, wherein
    the control unit allows the infrared light emission unit to periodically emit the second infrared light.

12. The remote control system according to claim 11, wherein
    the control unit further allows the infrared light emission unit to emit the second infrared light asynchronously with emission of the first infrared light.

13. The remote control system according to claim 10, wherein
    there are a plurality of infrared light emission units; and
    the control unit sequentially allows the infrared light emission unit to emit the second infrared light.

14. The remote control system according to claim 13, wherein
    the remote control device further comprises:
    a reflection unit reflecting the second infrared light emitted from the infrared light emission unit; and
    a shutter unit provided with the reflection unit and capable of shading an emission direction of the infrared light.

15. The remote control system according to claim 14, wherein
    when the shutter unit is closed, the infrared light reception unit receives only infrared light reflected by the reflection unit.

16. The remote control system according to claim 10, further comprising
 a reporting unit for reporting an abnormal condition of the infrared light emission unit based on a determination result.

17. The remote control system according to claim 10, wherein
 the remote control device is a communication converter converting a communication system and/or a communication protocol for enabling communications between the medical device and the medical control device.

18. The remote control system according to claim 10, wherein
 the remote control device is a remote controller controlling the medical control device.

* * * * *